US005498836A

United States Patent [19]

Okamoto et al.

[11] Patent Number: 5,498,836

[45] Date of Patent: Mar. 12, 1996

[54] CONTROLLER FOR TONE SIGNAL SYNTHESIZER OF ELECTRONIC MUSICAL INSTRUMENT

[75] Inventors: Tetsuo Okamoto; Satoshi Usa, both of Hamamatsu, Japan

[73] Assignee: Yamaha Corporation, Japan

[21] Appl. No.: 418,869

[22] Filed: Apr. 7, 1995

Related U.S. Application Data

[63] Continuation of Ser. No. 988,181, Dec. 9, 1992, abandoned.

[30] Foreign Application Priority Data

Dec. 13, 1991 [JP] Japan .................................... 3-352290

[51] Int. Cl.[6] ................................ G01P 3/00; G10H 5/00

[52] U.S. Cl. ................................ 84/658; 84/659; 84/662; 84/626

[58] Field of Search ............................ 84/626, 658, 659, 84/662, 663

[56] References Cited

U.S. PATENT DOCUMENTS

| | | | |
|---|---|---|---|
| 5,069,106 | 12/1991 | Sakashita | 84/626 |
| 5,179,242 | 1/1993 | Usa | 84/658 |
| 5,187,313 | 2/1993 | Inoue | 84/622 |
| 5,246,487 | 9/1993 | Oguri | 84/622 X |
| 5,247,131 | 9/1993 | Okamoto et al. | 84/658 |
| 5,248,844 | 9/1993 | Kunimoto | 84/622 |
| 5,272,275 | 12/1993 | Kunimoto | 84/661 |
| 5,276,272 | 1/1994 | Masuda | 84/600 X |

FOREIGN PATENT DOCUMENTS

| | | |
|---|---|---|
| 1-179996 | 7/1989 | Japan . |
| 3-185498 | 8/1992 | Japan . |

*Primary Examiner*—William M. Shoop, Jr.
*Assistant Examiner*—Jeffrey W. Donels
*Attorney, Agent, or Firm*—Graham & James

[57] ABSTRACT

A controller for controlling a plurality of parameters to be used by a physical model tone signal synthesizer electronically simulating a tone generating mechanism of a natural musical instrument. In accordance with musical performance signals such as dynamics and tone color entered by a player, musical instrument playing parameters such as breath and embouchure, or bow speed and bow pressure, are generated by using correlation functions.

17 Claims, 15 Drawing Sheets

CONTROLLER FOR TONE SIGNAL SYNTHESIZER OF ELECTRONIC MUSICAL INSTRUMENT

This is a continuation of application Ser. No. 07/988,181 filed on Dec. 9, 1992, now abandoned.

BACKGROUND OF THE INVENTION

1. Field of the Invention

The present invention relates to a controller for a tone signal synthesizer of an electrical musical instrument, and more particularly to a controller for a physical model tone signal synthesizer electronically simulating a sound generating mechanism of a natural musical instrument.

2. Description of the Related Art

As one of tone signal synthesizer circuits of electronic musical instruments, there is known a tone signal synthesizer called a physical model tone signal synthesizer of the type which simulates the sound generating mechanism of a natural musical instrument. Such a synthesizer is suitable particularly for stringed instruments and wind instruments which generate continuous sounds. For the generation of musical tones of stringed instruments, a pitch signal as well as a bow pressure, a bow speed signal, and the like are required. For the generation of musical tones of wind instruments, a pitch signal as well as a breath signal, embouchure signal, and the like are required.

Referring to FIG. 17, an example of the structure of a physical mode tone signal synthesizer will be described. The description is first directed to stringed instruments.

Bow speed and pressure information is supplied via gates 112 and 120 which are opened (turned ON) in response to a key-on signal and closed (turned OFF) in response to a key-off signal.

Bow speed information supplied while the gate 112 opens in response to the key-on signal, is inputted to an adder 113 and, via an adder 115 and subtracter 117, to a non-linear circuit 118. The non-linear circuit 118 simulates the non-linear characteristics of a stringed instrument. This circuit 118 outputs a signal proportional to an input signal when the latter is small, and outputs a signal smaller than, and non-linearly changing with, an input signal when the latter is larger than a predetermined value.

Such a characteristic provides an approximate alternative of a motion of a string of, for example, a violin determined by static and dynamic friction coefficients of the string and bow. An output of the non-linear circuit 118 is supplied via a multiplier 119 to adders 125 and 126.

The adders 125 and 126 are positioned symmetrically on a transmission line forming a closed loop. This closed loop provides an approximate alternative of a motion of a string of a stringed instrument, and includes a pair of delay circuits 128, 129, a pair of low-pass filters 131 and 132, a pair of attenuators 134 and 135, and a pair of multipliers 137 and 138.

The delay circuits 128 and 129 provide a delay of a signal circulating the closed loop, and determine a pitch of a tone to be generated. The pair of delay circuits 128 and 129 provide approximate alternatives of two string portions, one being a string portion from a fixed end or fret to the drawing position of a bow across the string, and the other being a string portion from the drawing position to the position of a finger pressing the finger board.

While a vibration transmits over the string, this vibration signal changes with the characteristics of the string. The vibration attenuates while transmitting over the string. The pair of attenuators 134 and 135 control the attenuation amounts to simulate the attenuation of a signal transmitting over the string. When a key-off signal is inputted, the attenuation amounts increase greatly to stop the vibration of the string.

The vibration of the string reflects from the fixed end or fret, and the phase is inverted at the fixed end. The multipliers 137 and 138 multiply their inputs by a fixed coefficient "1". In this case, the phase is inverted by the reflection without attenuation. In an actual case of a natural musical instrument, although the vibration is attenuated by such a reflection, this attenuation can be taken into account by adding it to the attenuators 134 and 135.

The delay circuits 128 and 129 and low-pass filters 131 and 132 are supplied with a tone color signal to adjust the signal waveform. As a signal circulates the closed loop, the motion of a vibration transmitting over the string and reflected to the initial position can be simulated.

The outputs of the multipliers 137 and 138 are supplied to an adder 140. This represents that the vibrations travelling from opposite sides are supplied to the drawing position. Both the inputs incoming from opposite sides are added together by the adder 140, and the result is supplied to the adder 113 to be added to the current bow speed signal.

Namely, while a continuous sound is generated by drawing the bow across the string, a vibration of the continuous sound generated by the string is added to the a vibration newly generated by drawing the bow across the string, to generate a resultant musical tone.

The non-linear circuit 118 has a divisor 117 on the input side and a multiplier 119 on the output side. The divisor 117 and multiplier 119 receive a bow pressure signal via the gate 120.

Specifically, an input to the non-linear circuit 118 is changed to a small signal through the division by the bow pressure signal, and an output from the non-linear circuit 118 is changed to a large signal through the multiplication by the bow pressure signal. In other words, if the characteristic of the non-linear circuit 118 is fixedly set, the input and output signal scales of the non-linear circuit 118 change with the bow pressure signal. This simulates that as the bow pressure signal becomes large, the linear portion of the characteristic is expanded to broaden the static friction coefficient area.

An output of the multiplier 119 is fed back to the adder 115 via a low-pass filter 122 and adder 123. The characteristic of the non-linear circuit 118 has a linear portion representing the static friction coefficient and a small output portion representing the dynamic friction coefficient on the outer side of the linear portion, both the portions being stepwise switched.

As an input signal to the non-linear circuit 118 becomes large to the extent that it enters the region governed by the dynamic friction coefficient, the output becomes small and the feedback amount fed back to the input side via the feedback loop reduces accordingly. If an input signal is reduced after it once entered the dynamic coefficient region, the feedback amount is small corresponding to the small output signal. Therefore, switching between both the portions occurs by a small signal value.

Near the switching region, the feedback amount when an input signal to the non-linear circuit 118 is increasing is different from that when an input signal is decreasing, providing the characteristic with a hysteresis.

The low-pass filter 122 is provided for preventing oscillation or the like. In the tone signal generating circuit shown in FIG. 17, the pitch information as well as the bow speed and pressure information are used as important parameters for generating tone signals.

In the case of wind instruments, in place of the bow speed and pressure signals, a breath signal "pr" and an embouchure signal "em" are used. The breath signal "pr" represents the pressure information of breath blown from a mouthpiece, and the embouchure signal "em" represents the embouchure of a player. The breath signal serves as a drive source of vibrations, and the embouchure signal is used for controlling the tone color or the like. The divisor 115, non-linear circuit 118, and multiplier 119 are replaced by a non-linear circuit representing vibrations within the tube of a wind instrument. The closed loop including the delay circuits 128 and 129 is replaced by a circuit representing the tube of a wind instrument in which vibrations reciprocate.

As methods of controlling such a physical model tone signal synthesizer, there is known a method which uses a velocity and after-touch obtained from keyboard manipulators. There is also known a method which used wind controllers and stringed instrument manipulators, obtains a breath signal, embouchure signal, bow speed signal, bow pressure signal, and the like from sensors provided to controllers and manipulators, and supplies them to a physical model tone signal synthesizer.

Single data supplied to a physical model tone signal synthesizer gives various influences to a generated tone. For example, consider a wind instrument, the sound volume is controlled mainly by a breath signal and the tone color is controlled mainly by an embouchure signal. However, if the breath signal is increased to increase the sound volume, the tone color is also changed, or conversely if the embouchure signal is changed to change the tone color, the sound volume is also changed.

In order to increase the sound volume without changing the tone color, it is necessary to increase the breath signal and decrease the embouchure signal. This corresponds to that in increasing the sound volume of, for example, a natural instrument saxophone, the embouchure first relaxes to ease the vibration of a reed, and then a breath is strongly brown.

Furthermore, even if an embouchure signal only is changed to change the tone color while maintaining the sound volume unchanged, the sound volume will change. It is therefore necessary in this case to change the embouchure signal and adjust the breath signal.

Also in the case of stringed instruments, the sound volume depends mainly on the bow speed signal, and the tone color depends mainly on the bow pressure signal. However, both the sound volume and tone color are not determined only by the bow speed or bow pressure. As above, the input parameters to the physical model tone signal synthesizer and target musical tone characteristics have no one-to-one correspondence, and they are related to each other in a complicated way.

An envelope generator EG for generating input parameters in a physical model tone signal synthesizer is an essential means for driving the synthesizer using a keyboard. A conventional envelope generator EG generates envelopes of control parameters of the synthesizer. If such an envelope generator is driven by a velocity or after-touch signal, it is almost impossible to independently control various musical characteristics.

Wind controllers and stringed instrument manipulators provided for giving a performance like that of natural musical instruments and directly control input parameters to the physical model tone signal synthesizer. Therefore, if performance know-how is learned through exercise, it is possible to produce desired musical tone characteristics.

However, such exercise requires to master algorithms and manipulators in order to produce desired musical tones using manipulators. It is practically impossible for a general keyboard player to give a desired performance.

As described so far, it is not easy for most players to give a performance satisfying desired musical effects by using a physical model tone signal synthesizer.

SUMMARY OF THE INVENTION

It is therefore an object of the present invention to provide a controller for a tone signal synthesizer of an electronic musical instrument capable of independently controlling a desired musical tone characteristic with a simple performance technique.

According to one aspect of the present invention, there is provided a controller for a tone signal synthesizer of an electronic musical instrument for generating a tone signal in accordance with a plurality of parameters, comprising: M manipulators responsive to a player performance each of which generates a signal representing an amount of operation thereof, wherein M is an integer greater than 2; and parameter producing means for producing N parameters in accordance with the signals generated from said M manipulators, wherein N is an integer greater than 2.

Since each of the plurality of manipulators controls the musical tone characteristic specific to the manipulator, the performance can be easily made.

By controlling each parameter in accordance with signals from a plurality of manipulators, it becomes possible for controlling the specific musical tone characteristic as desired in response to an operation of each manipulator.

It becomes possible to independently control each musical tone characteristic because a plurality of tone signal synthesizer parameters are controlled in a correlation manner by each musical tone characteristic desired by a player.

For example, in increasing the sound volume while playing a wind instrument, the breath pressure is increased and the embouchure is decreased by operating upon a single manipulator, so that the tone color generated by the physical model tone signal synthesizer will not change.

DETAILED DESCRIPTION OF THE PREFERRED EMBODIMENTS

Figure 1A:
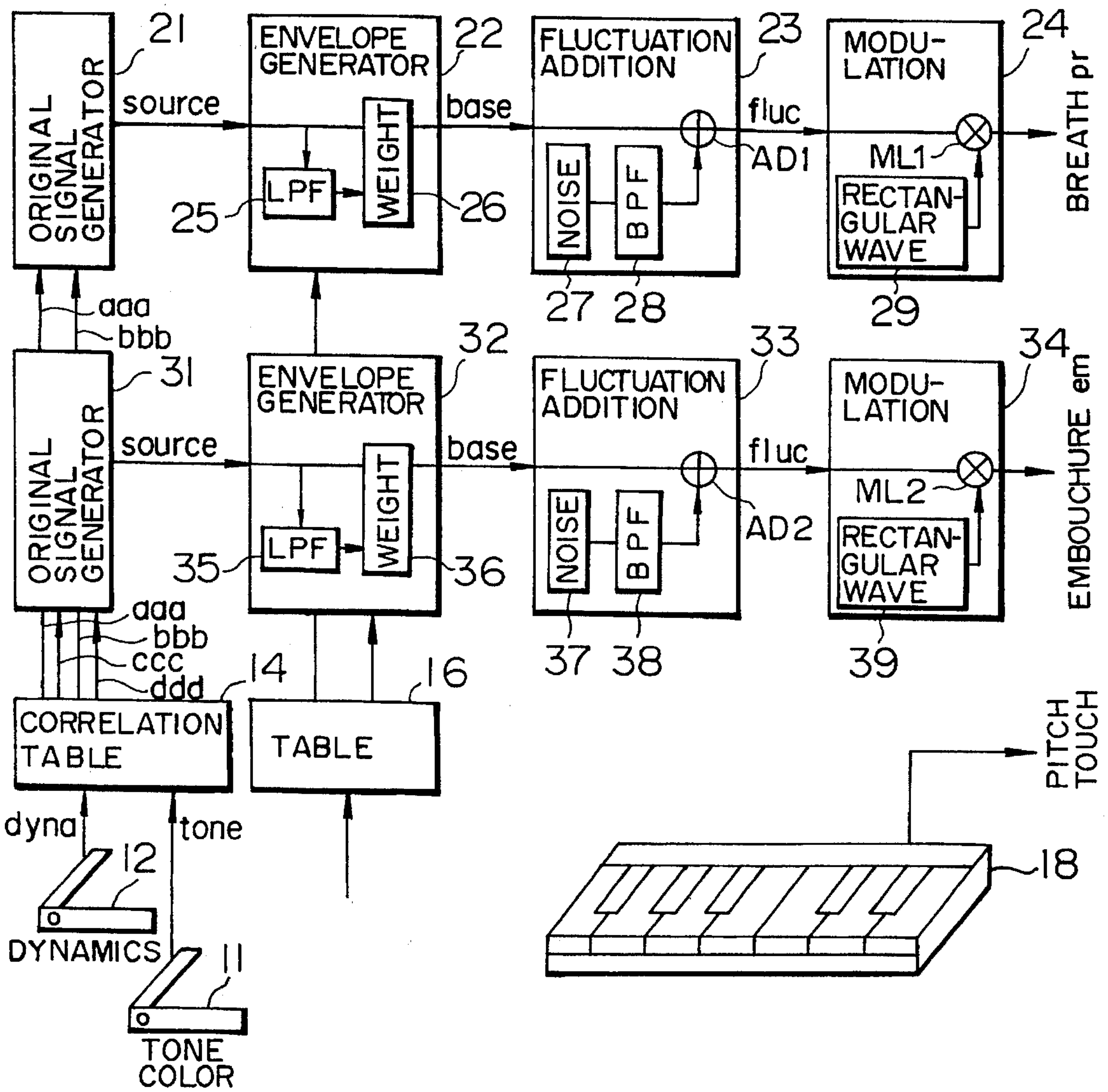
FIGS. 1A and 1B are a schematic circuit diagram showing an embodiment of a controller for a tone signal synthesizer according to the present invention, and a graph showing examples of signal waveforms.
Figure 1B:
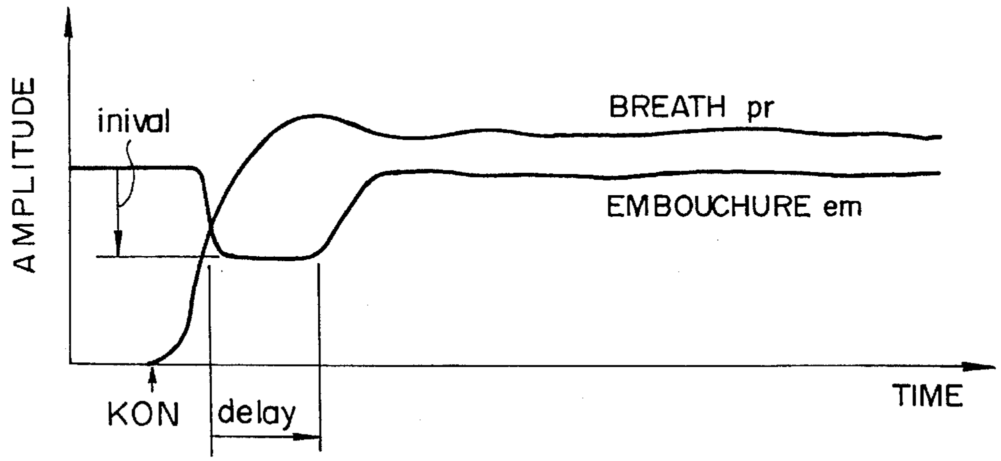

FIGS. 1A and 1B illustrate an embodiment of a controller for a tone signal synthesizer of an electronic musical instrument.

FIG. 1A shows the structure of the controller. Manipulators 11 and 12 shown as pedals generate a tone color signal and a dynamics control signal. These signals are depicted in FIG. 1A as "tone" and "dyna", respectively. The tone color signal "tone" and dynamics signal "dyna" are supplied to a correlation table 14. In accordance with the dynamics signal "dyna", the correlation table 14 generates a breath signal "aaa" and embouchure signal "ccc". In accordance with the tone color signal "tone", the correlation table 14 generates a breath signal "bbb" and embouchure signal "ddd".

An original signal generator 21 generates an original breath signal "source" from the two breath signals "aaa" and "bbb". This original breath signal "source" is a signal combining the two breath signal components "aaa" and "bbb", the former depending upon the dynamics signal "dyna" corresponding to the manipulation amount of the dynamics pedal 12 and the latter depending upon the tone color signal "tone" corresponding to the manipulation amount of the tone color signal "tone".

Another original signal generator 31 generates an original embouchure signal "source" from the two embouchure signals "ccc" and "ddd" supplied from the correlation table 14. Like the original breath signal "source", this original embouchure signal "source" is a signal combining the two dynamics signal components "ddd" and "ccc", the former depending upon the signal "tone" corresponding to the manipulation amount of the tone color pedal 11 and the latter depending upon the signal "dyna" corresponding to the manipulation amount of the dynamics pedal 12.

In an envelope generator 22, the inputted original signal "source" is passed through a low-pass filter LPF 25 to smooth the rising and falling edges of the signal. This smoothed signal and the inputted original signal "source" are supplied to a weightening circuit 26 to form a sum of both the signals which sum is outputted as an envelope signal "base".

Another envelope circuit 32 has the same structure as that of the envelope circuit 22. The inputted original signal "source" is passed through a low-pass filter LPF 35. This filter output and the inputted original signal "source" are supplied to a weightening circuit 36 to form a sum of both the signals which sum is outputted as an envelope signal "base".

Weight coefficients read from a table 16 in response to a weight signal are supplied in advance to the weightening circuits 26 and 36.

The controller is further provided with fluctuation adders 23 and 33, and modulators 24 and 34.

The fluctuation adder 23 is a circuit for presenting a subtle amplitude change of a musical tone of a natural instrument naturally caused by human fluctuation. The fluctuation adder 23 has a noise generator 27 and a band-pass filter BPF 28. White noises generated by the noise generator 27 are passed through the band-pass filter BPF 28 to generate a natural fluctuation signal. This fluctuation signal is added by an adder AD1 to the envelop signal "base" to generate a fluctuation-added envelope signal "fluc".

The modulator 24 has a rectangular wave generator 29. An output signal of the rectangular wave generator 29 is supplied to a multiplier ML1 which modulates the fluctuation-added envelope signal "fluc" to generate a final breath signal "pr".

Like the fluctuation adder 23, the fluctuation adder 33 has a noise generator 37, band-pass filter BPF 38, and adder AD2, and generates a fluctuation-added envelope signal "fluc" by adding fluctuation to the envelope signal "base" supplied from the envelope generator 32.

Like the modulator 24, the modulator 34 has a rectangular wave generator 39 and multiplier ML2. The modulator 34 modulates the fluctuation-added envelope signal "fluc" generated by the fluctuation adder 33 to generate a final embouchure signal "em".

A modulation circuit using an external signal for the modulation, and other circuits may be provided. Performance manipulators such as a keyboard 18 of the electronic musical instrument generate a pitch signal, touch signal, and the like.

FIG. 1B shows examples of signal waveforms generated by the controller shown in FIG. 1A. The waveforms shown where obtained when a key of the keyboard 18 is depressed and a tone is generated. In this example, it is assumed that the tone color pedal 11 is maintained stepped on at a fixed level so as not to change the tone color, and a sound volume is increased as the key is depressed downward. It is also assumed that the dynamics pedal 12 is maintained stepped on at a fixed depth.

The breath signal "pr" rises in response to a key-on signal KON generated upon a key depression. This signal is added to natural fluctuation after it takes a relatively stable value. The embouchure signal "em" on the other hand has a predetermined intensity even before sound generation, takes a low value for a predetermined time period "delay" at the initial stage of sound generation, and thereafter rises to take generally a stable intensity. Similar to the breath signal "pr", the embouchure signal "em" is added to natural fluctuation after it takes a relatively stable value.

In this manner, the sound volume can be increased while maintaining the tone color unchanged, by increasing the breath signal and decreasing the embouchure signal in response to a key depression.

In addition to the case of increasing the sound volume, also in the cases of reducing the sound volume and changing the tone color, the breath signal "pr" and embouchure signal "em" change in cooperative association with each other simply by operating a single manipulator.

Figure 2:
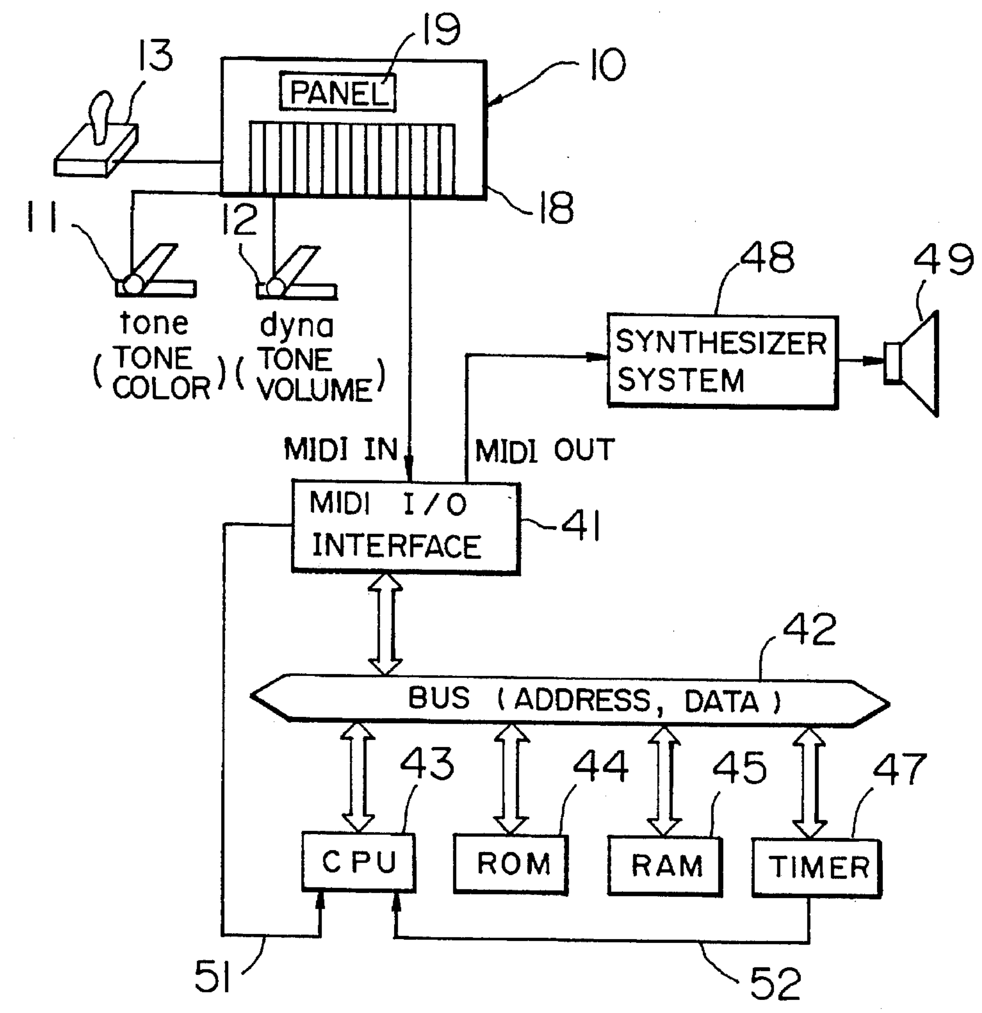
FIG. 2 is a circuit diagram showing the hardware structure of an electronic musical instrument having the controller shown in FIG. 1.

FIG. 2 illustrates the hardware structure of an electronic musical instrument having the controller shown in FIG. 1A.

An input unit 10 used for playing a musical performance has the keyboard 18 as well as the pedals 11 and 12 and a joy stick 13. Upon depression of a key, the keyboard 18 supplies information of a pitch signal KC, initial touch signal IT, after-touch signal AT, and the like. The pedal 11 is a manipulator for controlling the tone color "tone", and the pedal 12 is a manipulator for controlling the dynamics "dyna" such as sound volume. The joy stick 13 is a manipulator for controlling a pitch "pit" of vibrato. The keyboard 18 also has a control panel 19 and the like for performing various controls.

Tone control information of the input unit 10 is supplied via a musical instrument digital interface (MIDI) input/output unit 41 to a bus 42. Connected to this bus 42 are a ROM 44 for storing tone signal generating programs, a RAM 45 for storing registers and the like for use in computations, a timer 47 for generating timing signals and the like, and a CPU 43 for performing computations using a program stored in ROM 44 and registers or the like in RAM 45.

Connected to CPU 43 are an interrupt signal line 51 from the MIDI I/O interface 41 and an interrupt signal line 52 from the timer 47. In accordance with the tone control information from the input unit 10, CPU 43 generates tone control signals in the form of MIDI signals for controlling a physical model tone signal synthesizer, and supplies them to the bus 42.

Figure 17:
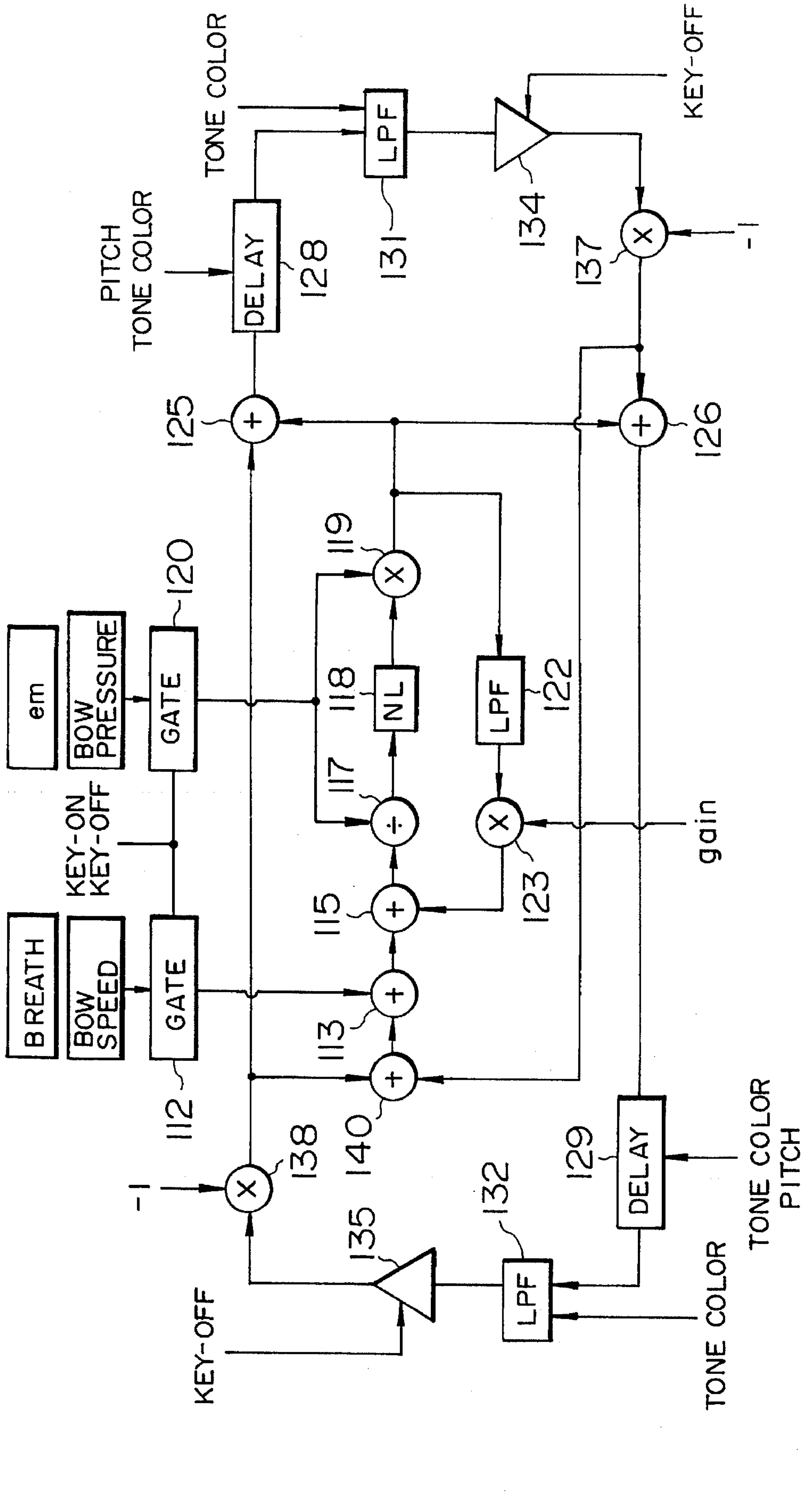
FIG. 17 PRIOR ART
FIG. 17 is a circuit diagram of a physical model tone signal synthesizer.

The tone control signals generated by CPU 43 are supplied via the bus 42 and MIDI I/O unit 41 to the tone signal synthesizer system 48. These control signals include a key code KC representing a pitch, a breath signal "pr", an embouchure signal "em", and the like. The tone signal synthesizer system 48 has a physical tone signal synthesizer such as shown in FIG. 17. An output signal of the tone signal synthesizer system 48 is supplied to a sound system 49 to generate a musical tone from a loudspeaker system.

Figure 3:
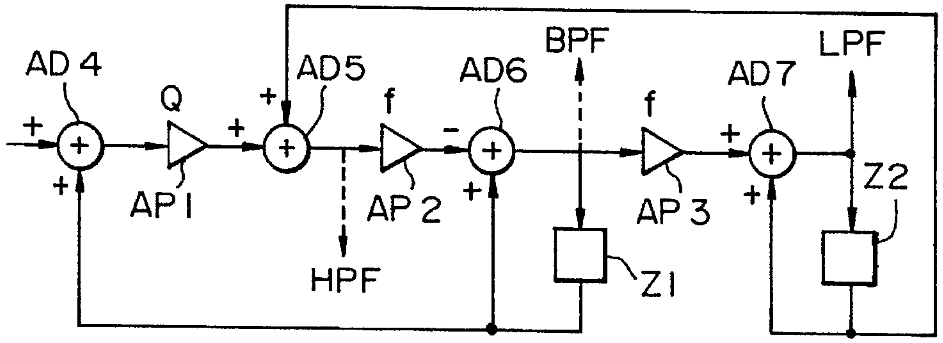
FIG. 3 is a circuit diagram showing an example of a filter circuit usable by the controller shown in FIG. 1A.

FIG. 3 shows an example of a filter circuit for realizing the low-pass filters LPF 25 and 35, band-pass filters 28 and 38, and the like, respectively shown in FIG. 1A.

Referring to FIG. 3, an input signal is supplied to one input terminal of an adder AD4. An output signal of the adder AD4 is supplied to a multiplier AP1 to multiply the input signal thereto by the characteristic Q. An output signal of the multiplier AP1 is supplied to one input terminal of an adder AD5. An output signal of the adder AD5 is supplied to a mulitplier AP2 to multiply the input signal thereto by the center frequency f of the filter. An output signal of the multiplier AP2 is applied to a minus terminal of an adder AD6 the output signal of which is fed back to a plus terminal of the adder AD6 via a delay circuit Z1. An output signal of the delay circuit Z1 is also fed back to the other input terminal of the adder AD4.

An output signal of the adder AD6 forms an output signal of a band-pass filter BPF, and is supplied to a multiplier AP3 to multiply the input signal thereto by the center frequency of the filter. An output signal of the multiplier AP3 is supplied to one input terminal of an adder AD7. An output signal of the adder AD7 forms an output signal of a low-pass filter LPF, and is fed back to the other input terminal of the adder AD7 via a delay circuit Z2. An output signal of the delay circuit Z2 is fed back to the other input terminal of the adder AD5. An output signal of the adder AD5 forms an output signal of a high-pass filter HPF.

The filter circuit shown in FIG. 3 can be used as a low-pass filter LPF, high-pass filter HPF, and band-pass filter BPF, using different output signal terminals. Although this filter circuit is of a hardware structure, the function of it may be realized by a digital filter using logical operations.

Next, the flow charts for realizing the function of the controller shown in FIG. 1A by using the hardware structure shown in FIG. 2 will be described.

Figure 4A:
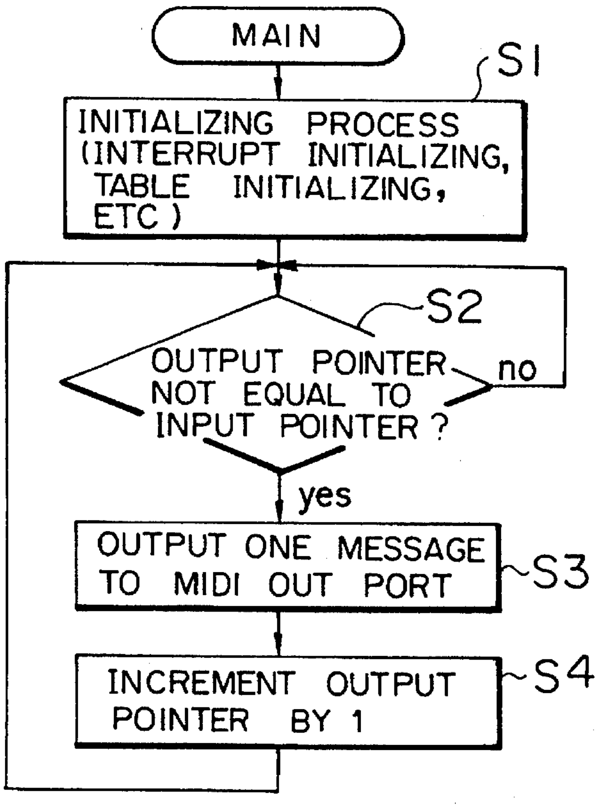
FIGS. 4A to 4C are flow charts showing basic operation routines of the electronic musical instrument.
Figure 4B:
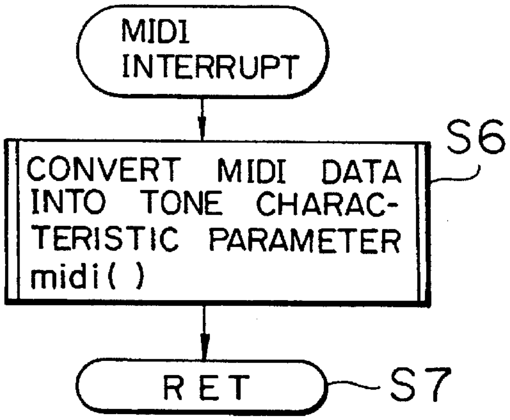
Figure 4C:
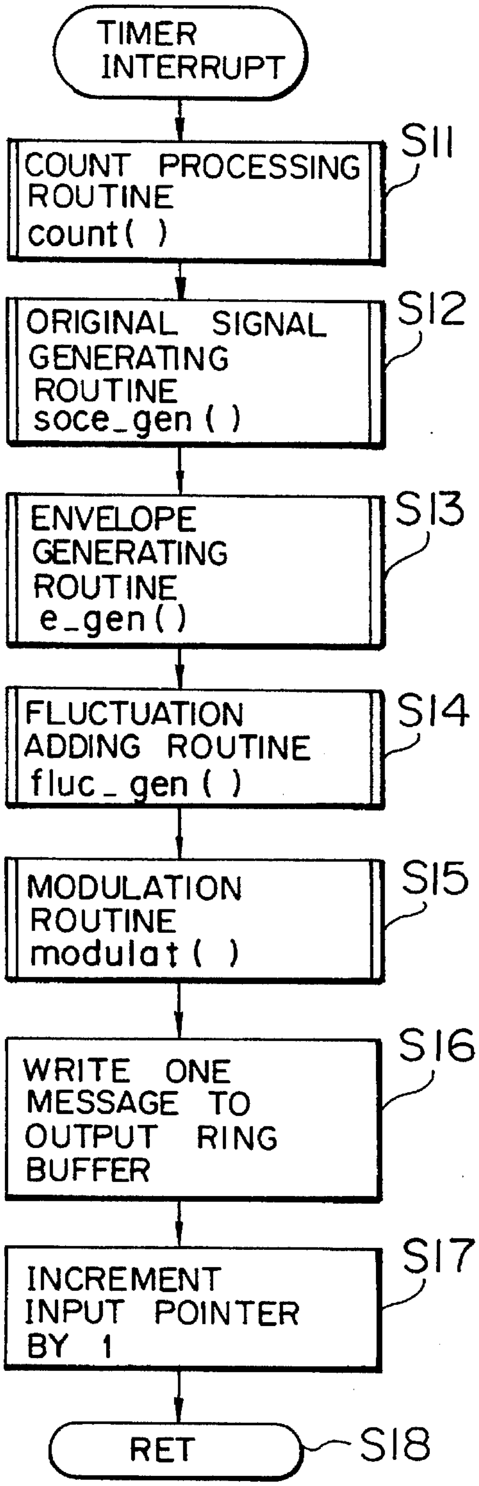

FIGS. 4A to 4C are fundamental flow charts showing the overall operation of the electronic musical instrument.

FIG. 4A shows a main flow.

At step S1, an initializing process is executed. For example, interrupt initializing, table initializing, and other necessary initializing are executed.

Next, at step S2, it is checked whether an output pointer is not equal to an input pointer. When a MIDI event occurs, signal pre-processing is executed, and one message is written in an output ring buffer as will be later described. Thereafter, the input pointer is incremented by "1". After this message is outputted, the output pointer is incremented by "1". Therefore, the input pointer becomes equal to the output pointer. If the output pointer is not equal to the input pointer, it means that a message was written in the output ring buffer, and it is still not outputted.

If the output pointer is not equal to the input pointer, the flow follows an YES arrow to advance to step S3 whereat the message written in the output ring buffer is outputted from a MIDI output port. Thereafter, at step S4 the output pointer is incremented by "1" to return to step S2. If the output pointer is not equal to the input pointer at step S2, the flow follows a NO arrow to stay at step S2.

FIG. 4B shows a MIDI interrupt process routine to be executed when a MIDI event occurs. At step S6, a "midi ()" process is executed for converting MIDI data into tone characteristic parameters. Thereafter, the flow returns from the interrupt routine.

FIG. 4C shows a timer interrupt routine. When a timer interrupt occurs, a count process routine "count ()" is executed at step S11. Then, at step S12 an original signal routine "soce_gen ()" is executed at the original signal generators 21 and 31 shown in FIG. 1A.

Next, at step S13 an envelope generating routine "e_gen ()" is executed at the envelope generators 22 and 32 shown in FIG. 1A.

At step S14 a fluctuation adding routine "fluc_gen ()" is executed at the fluctuation adders 23 and 33 shown in FIG. 1A.

At step S15 a modulation routine "modulat ()" is executed at the modulators 24 and 34 shown in FIG. 1A.

When these processes are completed, parameters for controlling the tone signal synthesizer system, such as a breath signal "pr" and embouchure signal "em", are generated as shown in FIG. 1A.

At step S16, one message indicating such synthesizer system controlling parameters and the like is written in the output ring buffer. At step S17 the input pointer is incremented by "1" to return from the interrupt routine at step S18.

The message is written in the output ring buffer at step S16 is outputted to the MIDI output port at step S3 described above.

The signal processing routines shown in FIGS. 4A to 4C will be further detailed below.

Figure 5:
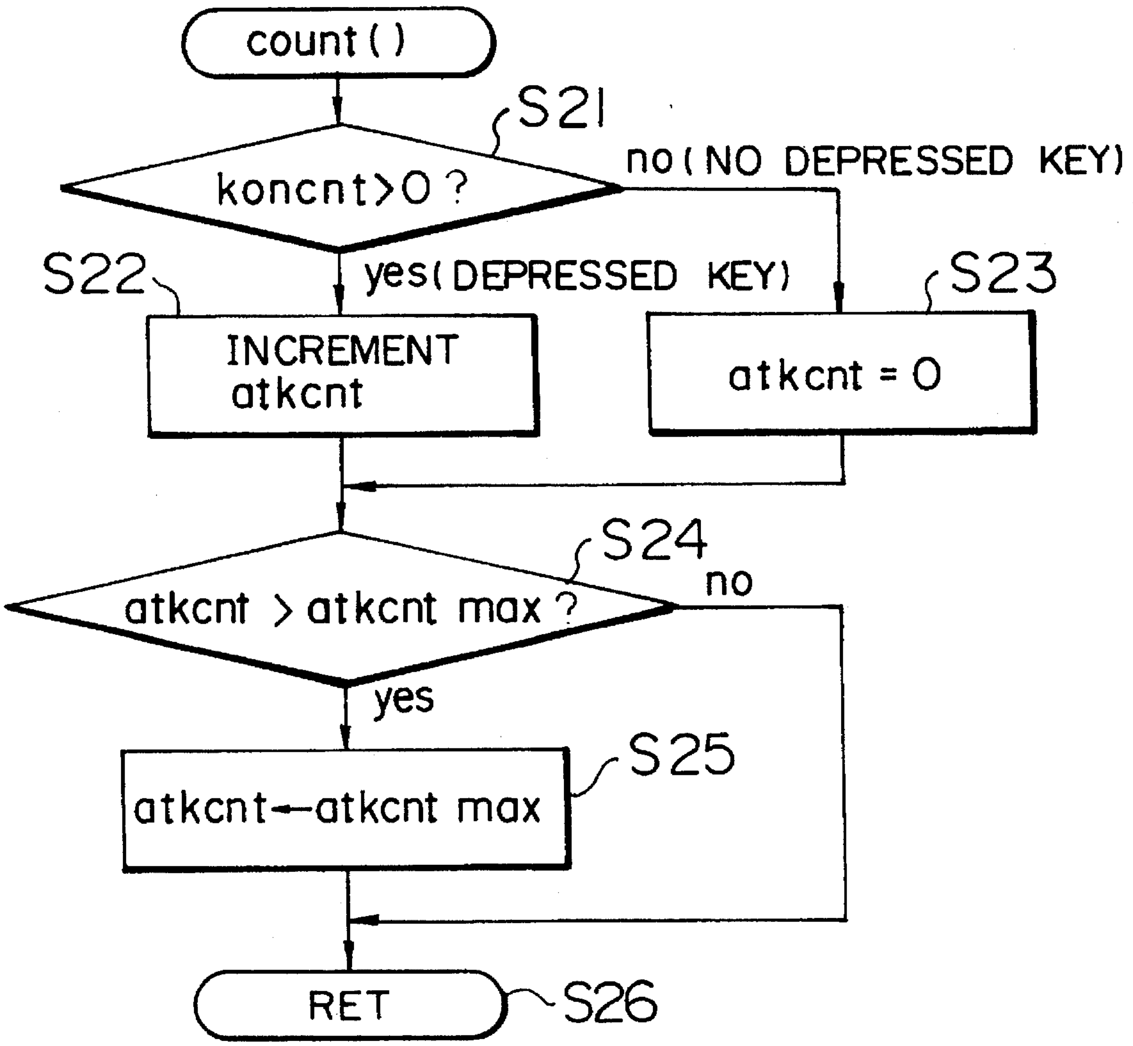
FIG. 5 is a flow chart showing a count process routine.

FIG. 5 illustrates the details of the count process routine at step S11 shown in FIG. 4C. An input parameter used by this routine is a key-on count "koncnt" representing the number of on-keys, and an output parameter is an attack count "atkcnt" representing the time lapse after a key was turned ON.

In this embodiment, a mono-tone instrument is assumed so that the key-on count "koncnt" is "1" or "0". In this routine, a parameter "atkcntmax" is used for defining the maximum value of "atkcnt". This parameter is used for a process of limiting "atkcnt", for example to about 1 second assuming that the count is effected every 10 msec.

When the routine starts, it is checked whether "koncnt" is positive or negative to judge if there is any key depression. If there is any key depression, the flow follows a YES arrow to advance to step S22 whereat the register "atkcnt" representing a time lapse after a key was turned ON, is incremented. If "koncnt is "0", there is no key depression and so the flow follows a NO arrow to advance to step S23 whereat "0" is set to the register "atkcnt".

Thereafter at step S24 it is checked whether the register (counter) "atkcnt" is in excess of the maximum value "atkcntmax". If it goes over the maximum value, the flow follows a YES arrow to advance to step S25 whereat the maximum value "atkcntmax" is set to the counter "atkcnt". If not in excess of the maximum value, the flow follows a NO arrow to bypass step S25 and the flow returns from the routine at step S26.

This routine is executed each time a timer interrupt occurs, for example, every 10 msec. Therefore, while a key is depressed, the count of the counter "atkcnt" continues to increase, and when it reaches the maximum value, it is fixed to this value. The counter "atkcnt" is used, for example, for the control of once lowering the embouchure "em" after the key-on and again raising it after a predetermined time lapse thereafter.

Figure 6:
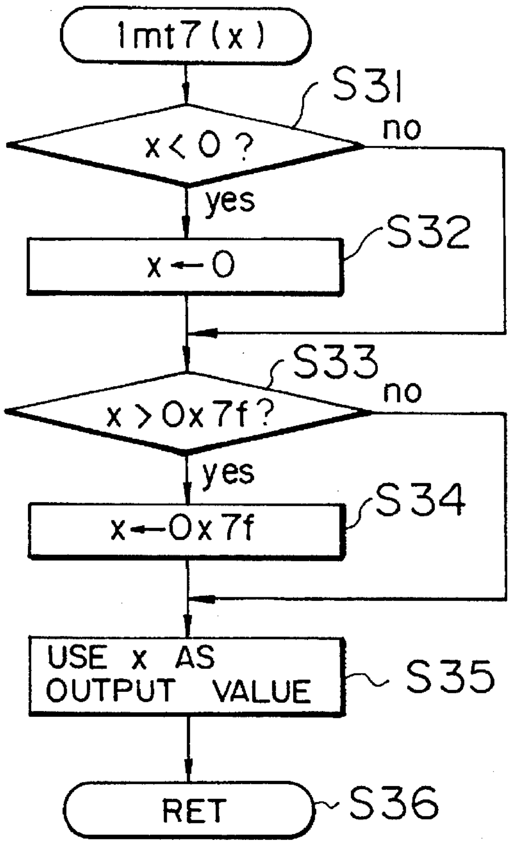
FIG. 6 is a flow chart showing the routine for a 7-bit limit function.

FIG. 6 illustrates a 7-bit limit function process "lmt 7" (x) where x is an input to this function.

When the process starts, it is checked at step S31 whether the input value x is negative. If the input X is negative, the flow follows a YES arrow to advance to step S32 where at "0" is set to x. If x is not negative, the flow bypasses step S32.

At step S33 it is checked if x is larger than 7f in hexadecimal notation. Ox represents the hexadecimal notation. 7f in hexadecimal is 127 decimal which corresponds to 7 bits in binary notation. If x is larger than Ox7f, the flow follows a YES arrow to advance to step S34 whereat Ox7f is set to x. If x is not larger than Ox7f, the flow bypasses to step S34.

The x obtained in this manner is used as an output value at step S35. The flow returns from the process at step S36.

As described above, if the input value is negative, 0 is set, if it is within the range from 0 to 127, the x value itself is used as an output value, and if it goes over 127, the output value is set to 127.

Figure 7:
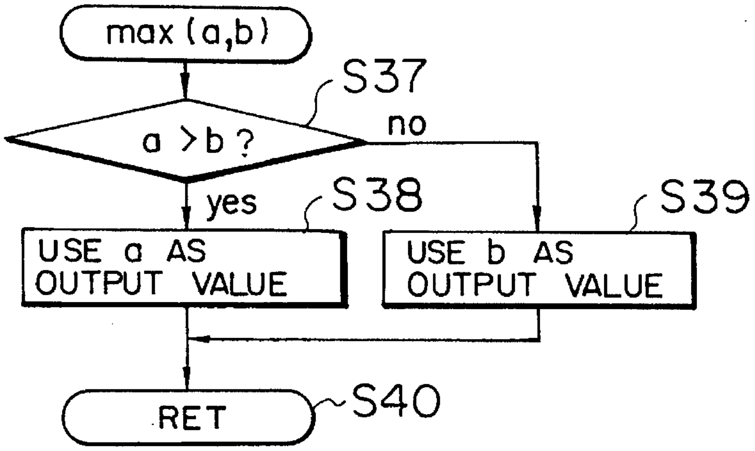
FIG. 7 is a flow chart showing the routine for a maximum value function.

FIG. 7 illustrates a maximum value function process max(a, b) where a and b are input values to this function.

When the process starts, it is checked at step S37 whether a>b or not. If a is larger than b, the flow follows a YES arrow to advance to step S38 whereat the value a is used as an output value.

If a is not larger than b, the flow advances to step S39 whereat the value b is used as an output value. Thereafter, the process returns at step S40.

In this manner, if a is larger than b, the value a is outputted, and if not, the value b is outputted.

The processes shown in FIGS. 6 and 7 are used in an original signal generating routine to be described below.

Figure 8A:
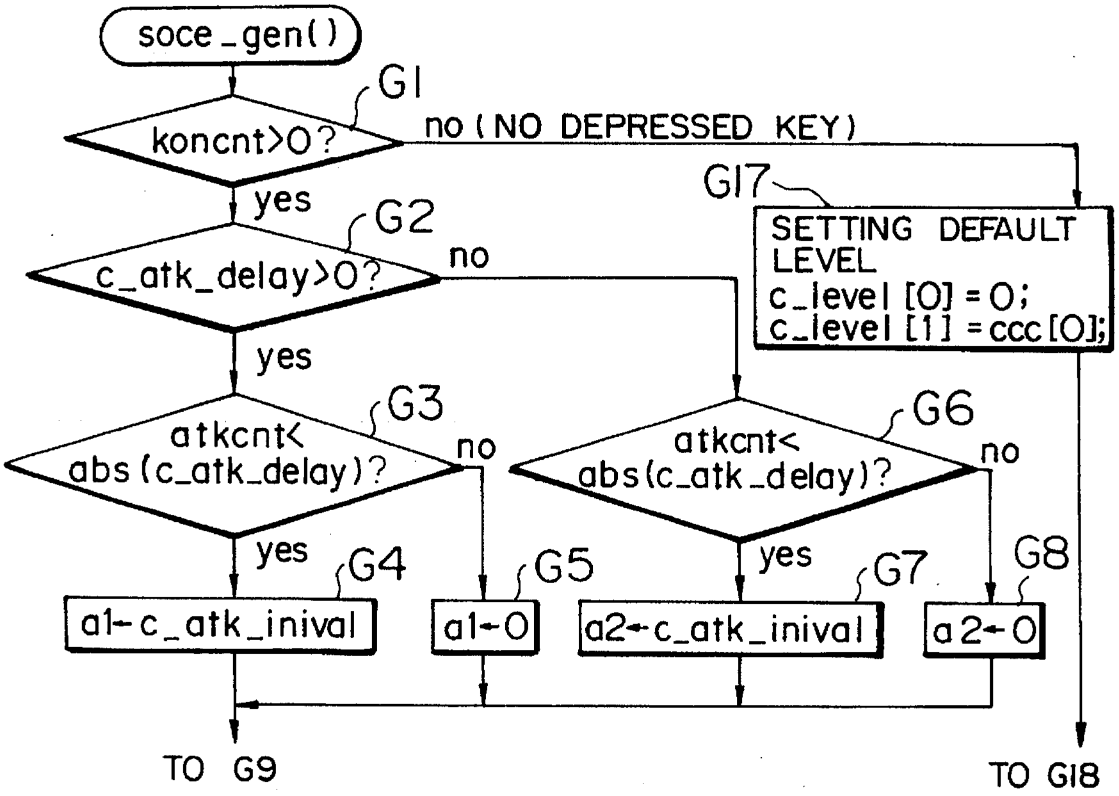
FIG. 8A and 8B are flow charts showing an original signal generating routine.
Figure 8B:
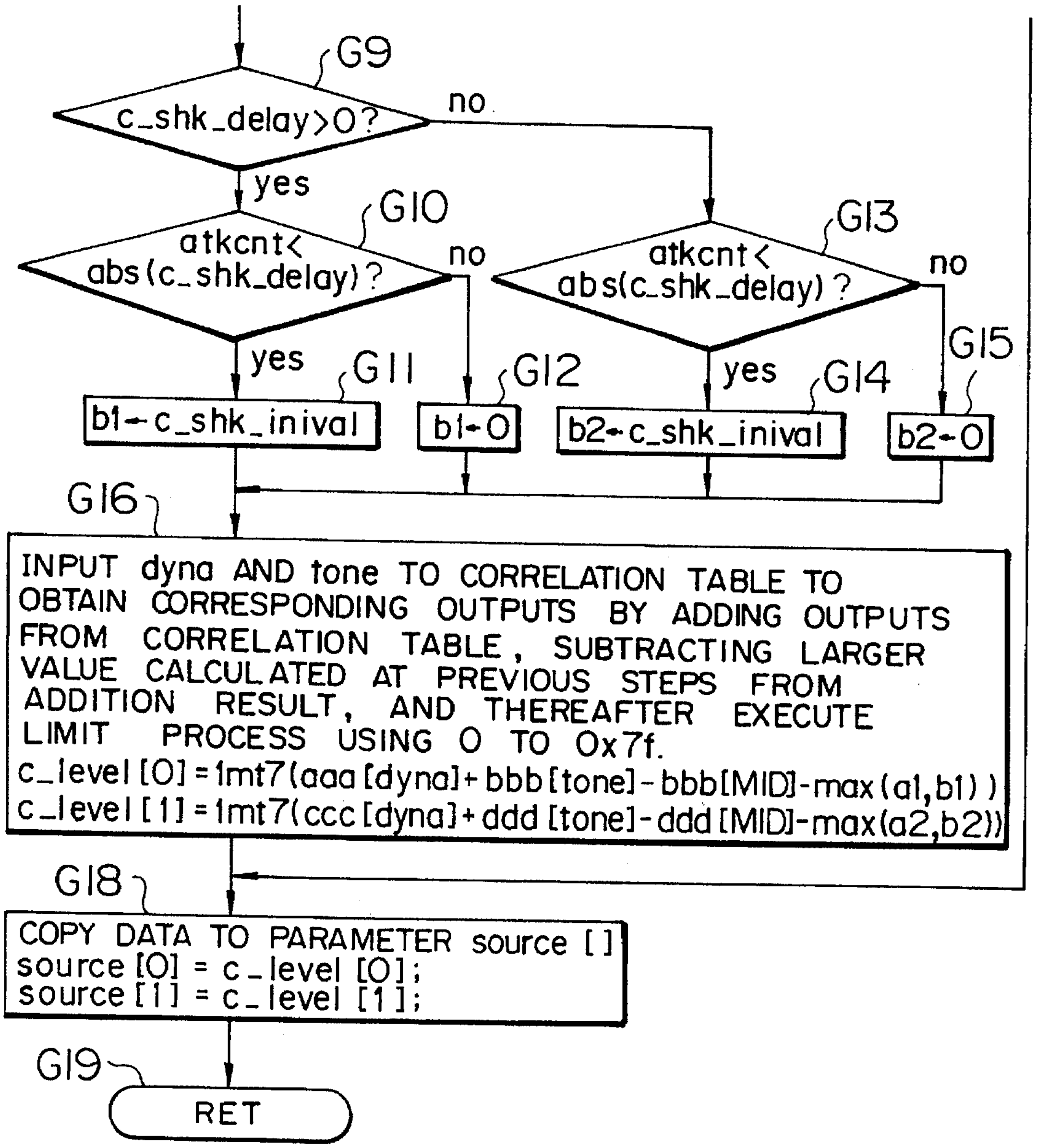

FIG. 8A and 8B show an original signal generating process "soce_gen ()" to be executed by the original signal generators 21 and 31 shown in FIG. 1A. In this process, the input parameter is "koncnt" representing the number of depressed keys and the output parameter is "source" which takes a number from 1 to 127. The internal local parameters a1, a2, b1, and b2 are used. These internal local parameters are initialized to "0" each time this routine is executed.

Parameters used in this process include the dynamics signal "dyna" and tone signal "tone" shown in FIG. 1A, "c_atk_delay" representing a delay of rise of the embouchure signal at the attack, c_shk_delay" representing a delay of the embouchure signal at the scoop, c_atk_inival" representing a drop level of the embouchure signal at the attack, "c_shk_inival" representing a drop level of the embouchure signal at the scoop, and "atkcnt" representing a time after the key-on.

Tables used in this process include, as shown in FIGS. 9A to 9D, a table storing a change of the breath component "aaa" relative to the dynamics "dyna", a table storing a change of the embouchure component "ccc" relative to the dynamics "dyna", a table storing a chance of the breath component "bbb" relative to the tone color "tone", and a table storing a change of the embouchure component "ddd" relative to the tone color "tone".

In the example shown in FIG. 1B, the embouchure signal "em" rises after the breath signal "pr" rises. This process also considers the case where the breath signal "pr" rises after the embouchure signal "em" rises. The parameter "c_atk_delay" representing a delay at the attack takes a positive value when the breath signal rises after the embouchure signal, and takes a negative value when the embouchure signal rises after the breath signal.

When the process starts, it is checked at step G1 whether the count "koncnt" representing the number of depressed keys is positive or negative. If there is a depressed key and "koncnt" is positive, the flow follows a YES arrow to advance to step G2 whereat it is checked whether the attack delay "c_atk_delay" is positive.

If the preset attack delay is positive, the flow follows a YES arrow to advance to step G3I whereat it is checked whether the value "atkcnt" representing a lapse time after the key-on is smaller than the absolute value of "c_atk_delay" representing the present delay time. If the time lapse after the key-on "atkcnt" is still smaller than the preset delay time, the flow follows a YES arrow to advance to step G4 whereat the preset drop level of the breath signal "c_atk_inival" is set as the internal parameter a1.

If the time lapse after the key-on "atkcnt" reaches the preset value, the flow follows a NO arrow to advance to step G5 whereat "0" is set as the internal local parameter a1. Namely, the internal local parameter a1 representing the drop level of the breath signal takes "0" after the present time lapse.

If the preset attack delay "c_atk_delay" is "0" or negative at step G2, the flow follows a NO arrow to advance to step G6 whereat like step G3 it is checked whether the time lapse after the key-on "atkcnt" is smaller than the absolute value of the present delay time "c_atk_delay". If the delay time after the key-on "atkcnt" is smaller than the preset value, the flow follows a YES arrow to advance to step G7 whereat the preset embouchure signal drop level "c_atk_inival" is set as the internal local parameter a2.

If the time lapse after the key-on "atkcnt" reaches the preset value, the flow follows a NO arrow to advance to step G8 whereat "0" is set as the internal local parameter a2.

Namely, a similar operation to the case where the rise of the breath signal is delayed from the rise of the embouchure signal, is executed for the case where the rise of the embouchure signal is delayed from the rise of the breath signal.

After steps G4, G5, G7, and G8, step G9 is executed. At step G9 a so-called scoop process is executed for generating two sounds of a saxophone or the like without any interception between them and with clear discrimination therebetween.

First at step G9 it is checked whether the scoop delay time "c_shk_delay" is positive. If positive, the flow follows a YES arrow to advance to step G10 whereat it is checked whether the time lapse after the key-on "atkcnt" is smaller than the absolute value of the present "c_shk_delay". If smaller, the flow follows a YES arrow to advance to step G11 whereat the preset c_shk_inival" is set as the internal local parameter b1.

If the time lapse after the key-on "atkcnt" becomes equal to or larger than the preset delay time, the flow follows a NO arrow to advance to step G12 whereat "0" is set as the internal local parameter b1. The processes at steps G10, G11, and G12 are similar to those at steps G3, G4 and G5, although the kinds of parameters used are different.

If the preset delay time is not positive at step G9, the flow follows a NO arrow to advance to step G13. Thereafter, step G14 or G15 is executed depending upon whether the time lapse after the key-on is smaller or larger than the present delay time.

The processes at steps G13, G14, and G15 are similar to those at steps G6, G7, and G8. At these steps the preset drop level of the embouchure signal is set as the internal local parameter b2.

After the above-described processes, the breath and embouchure data is obtained at step G16, the data being determined depending upon the dynamics "dyna" and tone color "tone".

Prior to describing the operation at step G16, signals to be generated from the correlation table 14 shown in FIG. 1A by using the dynamics signal "dyna" and tone signal "tone", will first be explained with reference to FIGS. 9A to 9D.

Figure 9A:
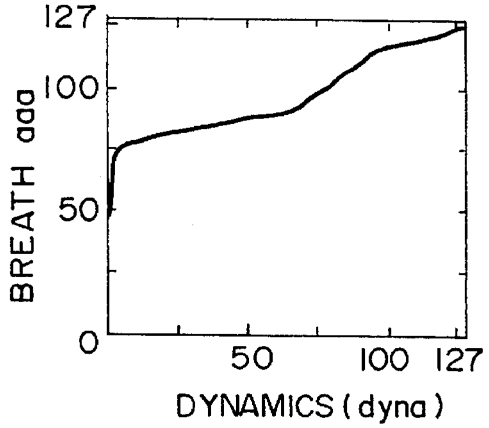
FIGS. 9A to 9F are graphs showing signal waveforms.
Figure 9B:
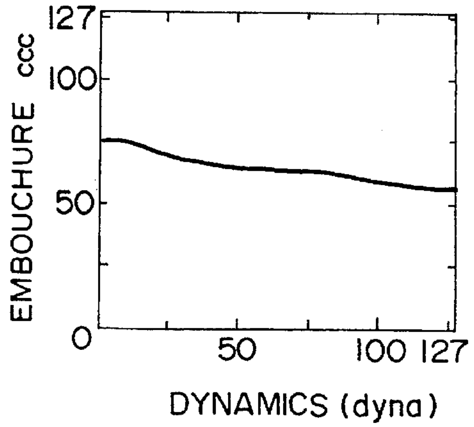

As shown in FIG. 9A and 9B, two signals "aaa" and "ccc" are generated upon input of the dynamics signal "dyna" to the correlation table. The signal "aaa" is a breath signal component, and the signal "ccc" is an embouchure signal component. The breath "aaa" and embouchure "ccc" change in a correlation manner with a change of the dynamics signal.

Figure 9C:
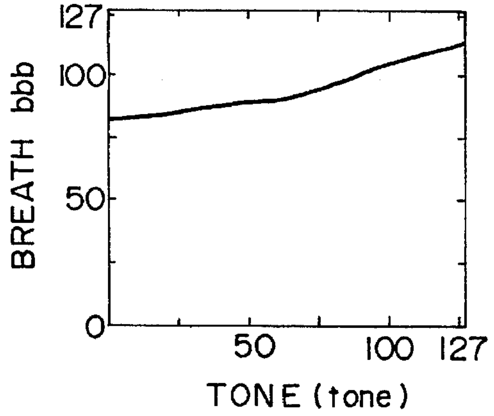
Figure 9D:
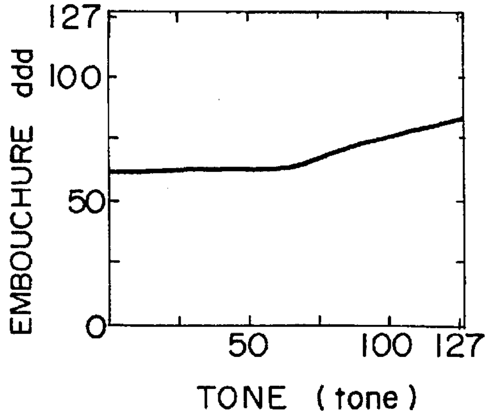

As the tone color "tone" changes, the correlation table generates two signals "bbb" and "ddd" as shown in the graphs of FIGS. 9C and 9D. The signal "bbb" is a breath signal component, and the signal "ddd" is an embouchure signal component. The breath signal component "bbb" and embouchure signal component "ddd" also change in a correlation manner with a change of the tone color.

At step G16, the signals "dyna" and "tone" generated by operating the manipulators are supplied to the correlation table, this table generates corresponding signals "aaa" [dyna], "ccc" [dyna], "bbb" [tone], and "ddd" [tone].

In order to set the average level of color tone designations to "0" for the convenience of processing, average values "bbb" [MID] and "ddd" [MID] are used. Also used are max (a1, b1) and max (a2, b2) obtained from the maximum value function using the final internal local parameters a1, b1, a2, and b2 at steps G11, G12, G14, and G15. Using these values, the breath signal and embouchure signal are given by:

*c_level* [0]=*lmt* 7 (*aaa* [*DYNA*]+*bbb* [*tone*]−*bbb* [*MID*]−*max* (*a*1, *b*1))

*c_level* [1]=*lmt* 7 (*ccc* [*dyna*]+*ddd* [*tone*]−*ddd* [*MID*]−*max* (*a*2, *b*2))

Namely, the breath signal is obtained by adding two signals "aaa" [dyna] and "bbb" [tone] obtained from the correlation table, level shifting the added result, and subtracting the larger one of a1 and b1 from the level-shifted result. The embouchure signal is obtained by adding two signals "ccc" [dyna] and "ddd" [tone] obtained from the correlation table, level shifting the added result, and subtracting the larger one of a2 and b2 from the level-shifted result. These values are adjusted by the 7-bit limit function "lmt 7" so as not to underflow them.

If there is no depressed key at step G1, a default level is set at step G17. Specifically, "0" is set to "c_level" [0] representing the breath signal "pr", and "ccc" [0] is set to "c_level" [1] representing the embouchure signal "em". "ccc" [0] represents an initial value of the embouchure signal preset even there is no external input.

Thereafter, at step G18, the data thus obtained is copied as parameter "source" []

In the above manner, output signals "source" of the original signal generators 21 and 31 shown in FIG. 1A are obtained. This process returns at step G19.

Figure 9E:
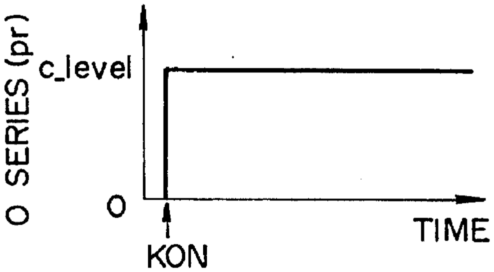
Figure 9F:
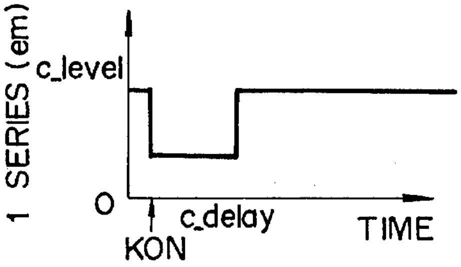

FIGS. 9E and 9F show a change with time of the waveforms synthesized as described above, for the case where the rise of the embouchure delays from that of the breath signal. The breath signal "pr" shown in FIG. 9E rises when the key-on KON is effected, and is a rectangular waveform having a constant value. The embouchure signal "em" shown in FIG. 9F lowers its level by a predetermined amount from its initial level when the key-on KON is effected, and resumes the initial value after a predetermined delay time.

Referring to FIG. 1A, the original signals "source" generated by the original signal generators 21 and 31 following the above-described processed, are supplied to the envelope generators 22 and 32 to give envelopes to the original signals.

Figure 10:
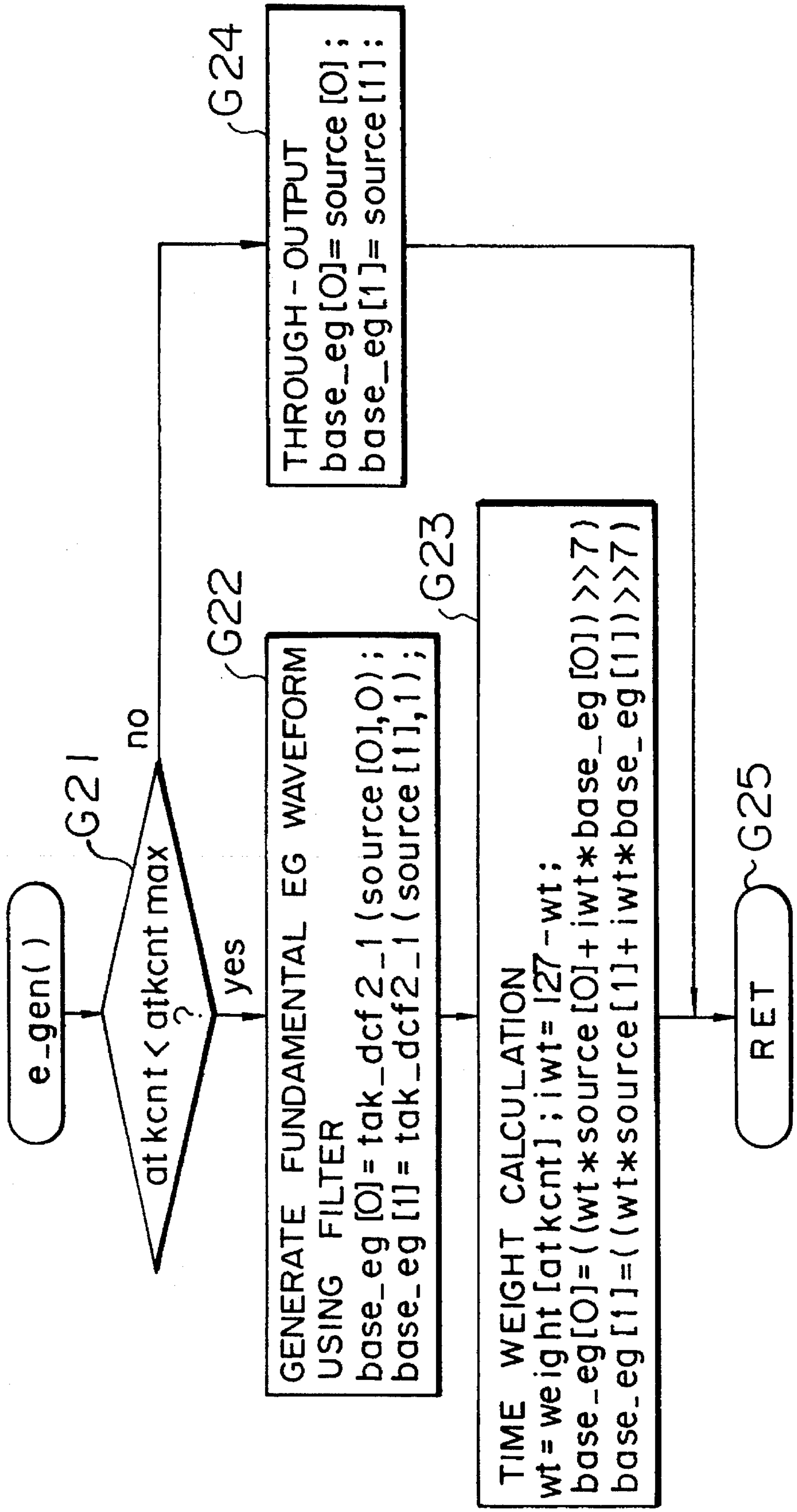
FIG. 10 is a flow chart showing an envelope generating routine.

FIG. 10 shows an envelope forming routine. In this routine, "source" [] generated by the original signal generators is used as the input parameter, and an envelope "base-eg" [] is generated as the output parameter. Parameters used in this process include "atkcnt" representing a time lapse after the key-on, "c_qq" [no] representing a Q value of the filter, "fcoef" [no] representing the center frequency of the filter, and other parameters. As global static variables, "hpf" [no], "lpf" [no], "bpf" [no] are used. The input value to the filter is represented by "in", and the series number is represented by "no".

When the process starts, it is checked at step G21 whether the time lapse after the key-on "atkcnt" is smaller than the preset maximum value "atkcntmax". If smaller than the present maximum value, the flow follows a YES arrow to advance to step G2 whereat a fundamental envelope EG is formed by the filter. Namely, using as an input the input parameter "source" [], a digital filter coefficient process "tak_dct2_1" () is performed.

More particularly, the following calculation is executed for each series:

base_eg []=tak_dcf2_1()

If "atkcnt" reaches the preset maximum value at G21, the flow follows a NO arrow to advance to step G24, and the input value itself is outputted. Namely, the output signal "base_eg" [] is the same as the input signal "source" [].

At step G23, a weightening calculation is performed in accordance with the time lapse. First, using the time lapse after the key-on "atkcnt", a weightening coefficient wt=weight [atkcnt] and its complement iwt=127−wt are read from the table 16. These coefficients are used for the weightening and addition calculation between the envelope "base_eg" [] filtered at the envelope generators 22 and 32 and the original input signal "source". Namely, the following calculation is executed for each series:

$$base\_eg\ []=((wt * source\ []+iwt * base\_eg\ [])$$

The added result is shifted to the right by 7 bits to adjust the bit positions.

Thereafter the process returns at step G25.

Figure 11:
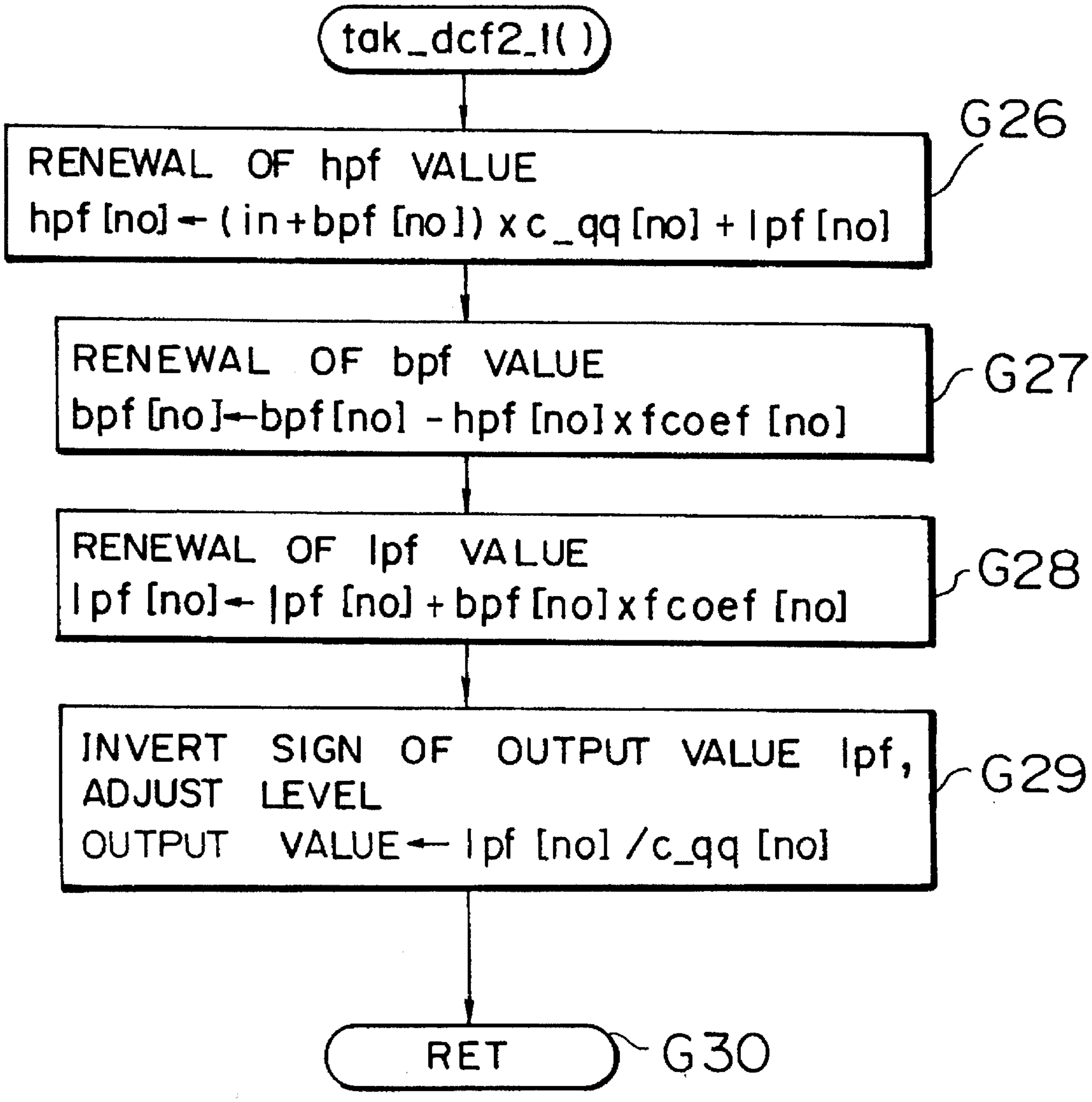
FIG. 11 is a flow chart showing the routine for a filter function.

FIG. 11 shows the filtering routine at step G22 shown in FIG. 10.

When the filter function process "tak_dcf2_1" () starts, the output value "hpf" of the high-pass filter is renewed at step G26.

hpf [no]←(in+bpf [no])*c_qq [no]+lpf [no]

Namely, the output signal of the high-pass filter is calculated by adding the input and output signals to and from the band-pass filter, multiplying the added result by the Q value, and adding to this multiplication result an output of the low-pass filter.

At step G27, the output value "bpf" of the band-pass filter is renewed.

bpf [no]←bpf [no]−hpf [no]*fcoef [no]

Namely, an output of the band-pass filter is multiplied by the center frequency, and the multiplication result is subtracted from the output of the band-pass filter. In this manner, the output value "bpf" of the band-pass filter is renewed.

At step G28, the output value "lpf" of the low pass filter is renewed.

lpf [no]←lpf [no]+bpf [no]*fcoef [no]

Namely, an output of the band-pass filter is multiplied by the center frequency, and the multiplication result is added to an output of the low-pass filter to calculate a new output of the low-pass filter.

In the above manner, the values of the high-pass filter, band-pass filter, and low-pass filter are calculated.

At step G29, since the low-pass filter is used at the envelope generating routine, the sign of the low-pass filter output "lpf" is inverted, the output level is adjusted, and thereafter, the value −lpf [no]/c_qq [no] is outputted. The process returns at step G30.

In the above manner, at the envelope generating routine, an input signal with a rapid change is transformed to a signal with a gentle change.

Figure 12:
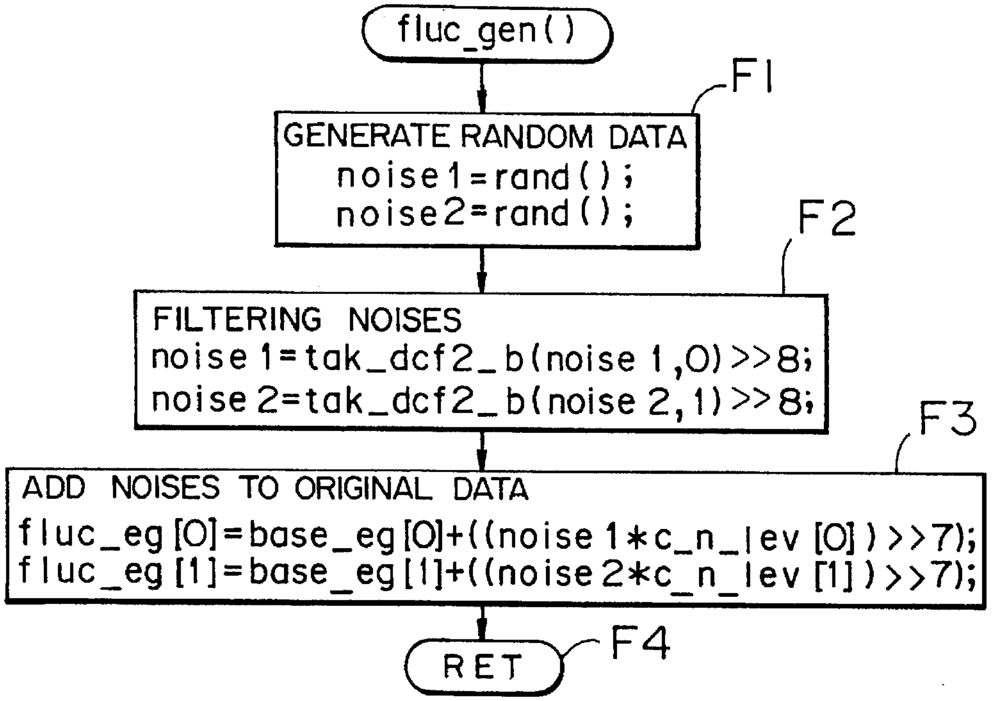
FIG. 12 is a flow chart showing a fluctuation adding routine.

FIG. 12 illustrates a fluctuation adding routine "fluc_gen" (). In this routine, the envelope "base_eg" [] generated by the envelope generator is used as an input parameter, and a fluctuation-added envelope "fluc_eg" [] is generated as an output parameter.

Parameters used at this routine include "c_n_qq_ [no] representing the Q value of the filter, "fcoefb [no] representing the center frequency of the filter, and "c_n_level" [] representing a level of noises to be added. A random function "rand" () is used for generating random values 0 to Ox7fff. As local variables of the function, "noise" 1 and "noise" 2 are used.

When the process starts, random data is generated at step F1. Namely, the value of the random function "rand" () is stored in a register "noise".

noise 1=rnd (), noise 2=rand ()

Next, preset noises are filtered at step F2. Namely, using as input signals "noise" 1 and "noise" 2 obtained at step F1, the filter function "tak_dcf2_b" is calculated.

noise 1=tak_dcf2_b (noise 1, 0)

noise 2=tak_dcf2_b (noise 2, 1)

Then, the noises are shifted to the right by 8 bits to adjust the bit positions.

At step F3, noises are added to the original data. In this case, the level or factor of "noise" 1 generated at step F2 to be added to the original data "base-eg" [] is determined by the parameter "c_n_lev" []. Namely, the following calculation is executed:

$$fluc\_eg\ [0]=base\_eg\ [0]+(noise1 * c\ n\ lev\ [])$$

Then, the result is shifted to the right by 7 bits to adjust the bit positions. The envelope "fluc-eg" [1] for "noise" 2 is calculated in the same manner.

In the above manner, the fluctuation-added envelope "fluc_eg" [0] and "fluc_eg" [1] are generated for the two series. Thereafter, the process returns to step F4.

Figure 13:
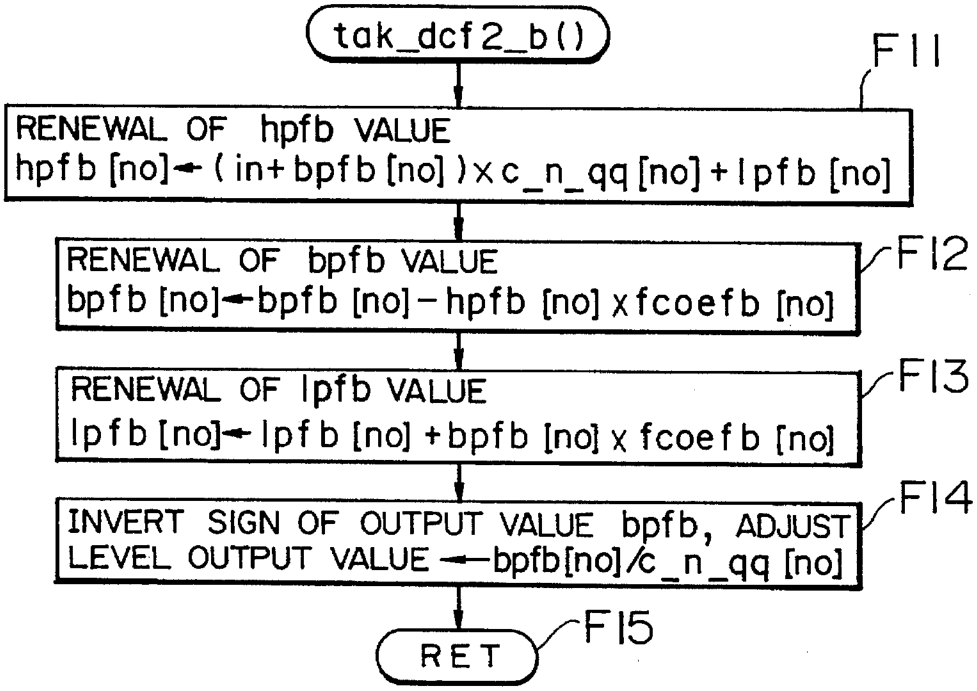
FIG. 13 is a flow chart showing the routine for a filter function used by the fluctuation adding routine.

FIG. 13 illustrates a filter function process routine to be executed at step F2 of FIG. 12.

When the process starts, the output "hpfb" of the high-pass filter is renewed at step F11. The output "bpfb" of the band-pass filter is renewed at step F12. The output "lpfb" of the low-pass filter is renewed at step F13. These calculations are similar to those at steps G26, G27, and G28 shown in FIG. 11.

Next, at step F14, the sign of the output "bpfb" of the band-pass filter is inverted, the output level is adjusted, and then the result is outputted. Namely, "- bpfb [no]/c_n_qq" [no] is outputted. The process returns at step F15.

In the above manner, fluctuation is added to the envelope to allow generating musical tones having a characteristic specific to human.

Figure 14:
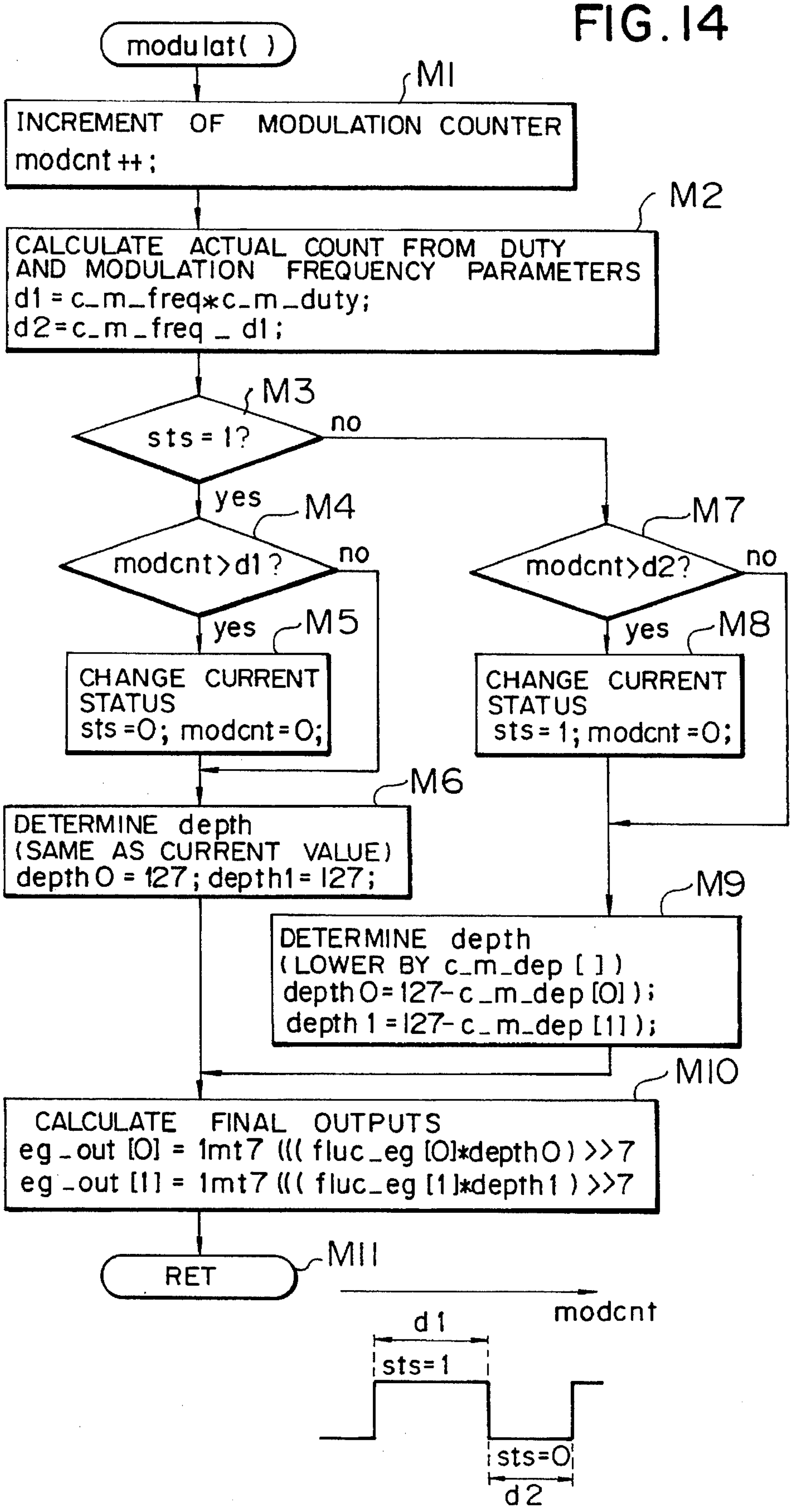
FIG. 14 is a flow chart showing a modulation routine.

FIG. 14 illustrates a modulation routine "modulat" (). At this process, the fluctuation-added envelope "fluc_eg" [] is used as an input parameter, and a modulated envelope "eg_out" [] is outputted as an output parameter. Parameters used at this process include "c_m_freq" representing a frequency of a rectangle modulation function, "c_m_duty" representing a duty of the modulation faction, and "c_m_dep" [] representing a level difference (depth) between on and off of the modulation function. Local variables used at this process include "d1" representing the count corresponding to a high level, "d2" representing the count corresponding to a low level, "modcnt" representing the count of a modulation counter, and "sts" representing whether the modulation function is high or low.

When the process starts, the modulation counter is incremented at step M1.

At step M2, the count "d1" corresponding to the high level and the count "d2" corresponding to the low level are calculated from the modulation function frequency "c_m_freq" and duty "c_m_duty".

d1=c_m_freq 8 c_m_duty $$d2=c\_m\_freq-d1$$

Next, at step M3 is it checked whether the modulation function is of a high state (sts=1).

If high state, the flow follows a YES arrow to advance to step M4 whereat it is checked whether the count "mdcnt" of the modulation counter is larger than "d1".

If "modcnt" is larger than "d1", the flow follows a YES arrow to advance to step M5 to renew the current state. Namely, the flag "sts" representing the state of the modulation function is set to "0", and the count "modcnt" of the modulation counter is set to "0". If "modcnt" is not larger than "d1" at step M4, step M5 is bypassed.

At step M6 the depth of modulation is determined. Since the modulation is of the high state and "sts"=1, the value same as the current value is outputted at step M6.

depth 0=127, depth 1=127

If "sts" is not "1" (i.e., sts=0) at step M3, the flow follows a NO arrow to advance to step M7 whereat it is checked whether the count "modcnt" of the modulation counter is larger than "d2". If "modcnt" is larger than "d2", the flow follows a YES arrow to advance to step M8 whereas the current state is renewed. Namely, the flag "sts" is set to "1" and the modulation count "modcnt" is set to "0".

If the count "modcnt" of the modulation counter is not larger than "d2" at step M7, the flow follows a NO arrow to bypass step M8.

At step M8, the depth of modulation is determined. In this case, since the flat "sts" is "0", the input signal is lowered by "c_m_dep" [].

*depth* 0=(127–*c_m_dep* [])

*depth* 1=(127–*c_m_dep* [])

After determining the depths at steps M6 and M9, the flow advances to step M10 to calculate the final results. Namely, the following calculations are executed:

*eg_out* [0]=*lmt* 7 ((*fluc_eg* [0]**depth* 0)>>7)

*eg_out* [0]=*lmt* 7 ((*fluc_eg* [1]**depth* 1)>>7)

Namely, the modulated signal level is obtained by multiplying the inputted fluctuation-added envelope "fluc_eg" by "depth". The multiplication result is shifted to the right by 7 bits to adjust the level. In order to avoid underflow, the output signal is limited by a bit limit function. The process returns at step M11.

Figure 15:
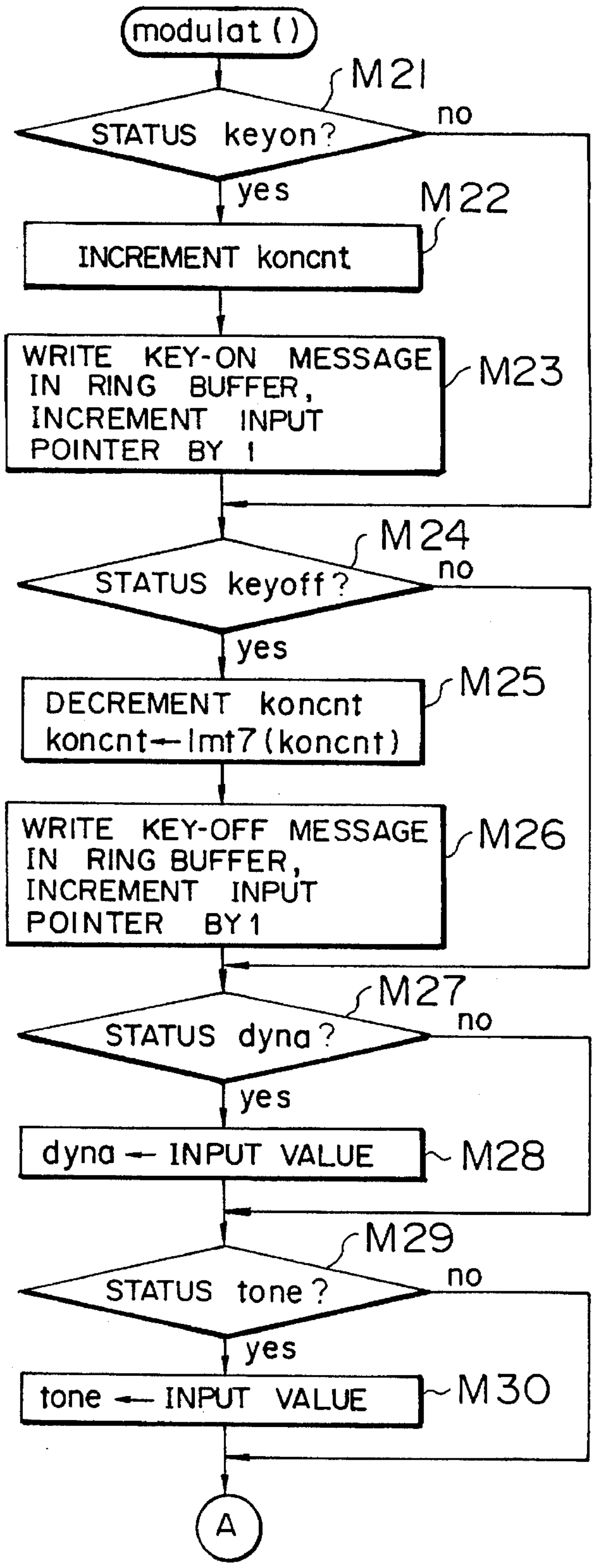
FIG. 15 is a flow chart showing a MIDI input interrupt process routine.
Figure 16:
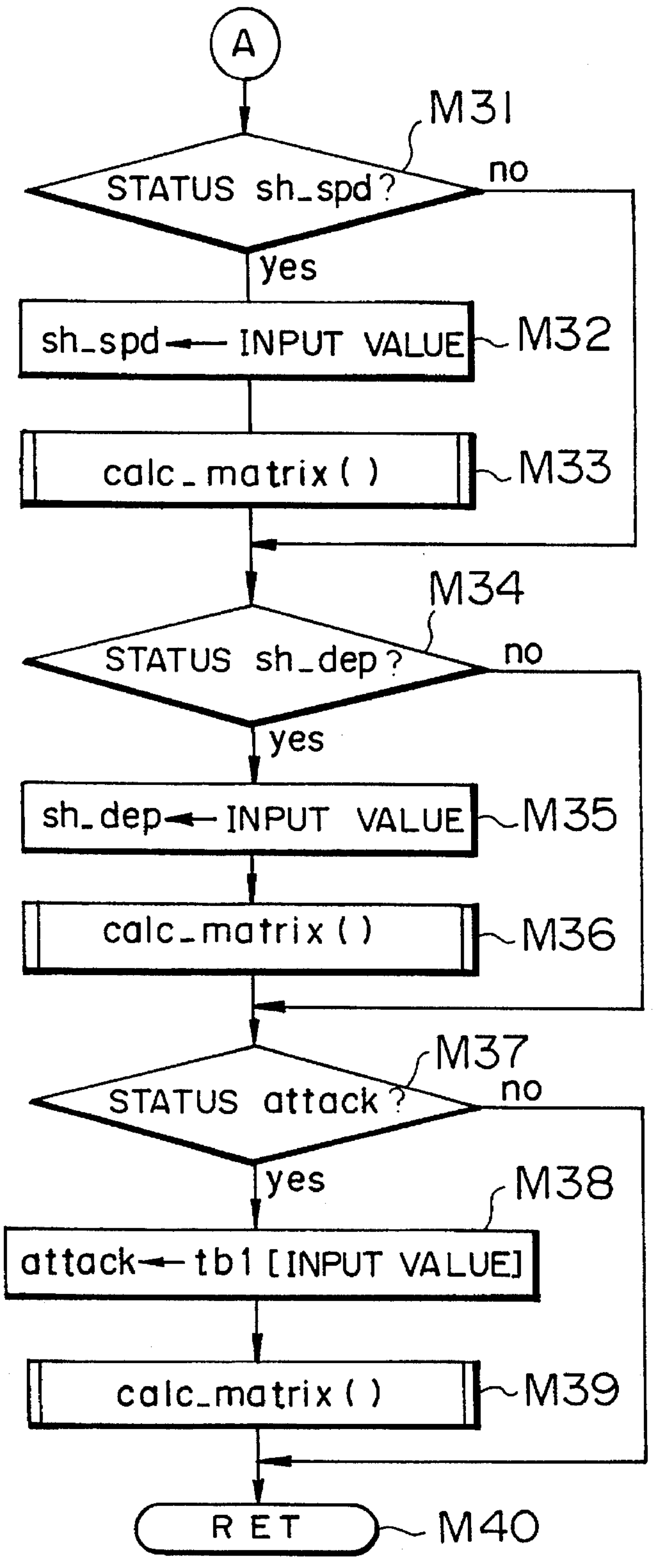
FIG. 16 is a flow chart continued from the flow chart shown in FIG. 15.

FIGS. 15 and 16 show an example of a MIDI interrupt routine.

When the process starts, it is checked at step M21 whether the status is "keyon" representing a key depression. If a key-depressed status, the flow follows a YES arrow to advance to step M22 whereat the "koncnt" representing the number of depressed keys is incremented. At step M23, a key-on message is written in the ring buffer and a write input pointer is incremented by 1.

If the status is not "keyon" at step M21, the flow follows a NO arrow to bypass steps M22 and M23.

At step M24 it is checked whether the status is the "keyoff" representing a key release. If key release, the flow follows a YES arrow to advance to step M25 whereat the "koncnt" representing the number of depressed keys is decremented. For the safety purpose, the value "koncnt" is processed by the limit function "lmt 7", and the resultant value is set as "koncnt". At step M26, a key-off message is written in the ring buffer, and the write input pointer is incremented by 1.

After detecting the operation on the keyboard in the above manner, the operation of pedals and other elements is detected.

At step M27 it is checked whether the status is the dynamics "dyna". If "dyna", the flow follows a YES arrow to advance to step M28 whereat the input dynamics value is set to the register "dyna". If not "dyna" at step M27, the flow follows a NO arrow to bypass step M28.

At step M29 it is checked whether the status is the tone color "tone". If "tone", the flow follows a YES arrow to advance to step M30 whereat the inputted tone data is set to the register "tone". If not "tone" status at step M29, the flow follows a NO arrow to bypass step M30.

In the system arrangement shown in FIGS. 1A, 1B and 2, the dynamics and tone are inputted by using two pedals. These parameters may be set in accordance with other manipulation information. For example, an after-touch of a depressed key on the keyboard, an input from a joy stick, and the like may also be used. The number of pedals is not limited to two.

FIG. 16 is a continuation part of the flow chart shown in FIG. 15.

At step M31 it is checked whether the status is "sh-spd" representing the speed of a scoop. If "sh_spd", the flow follows a YES arrow to advance to step M32 whereat the input value is set to the register "sh-spd". At step M33, a calculation is executed using both the scoop speed and depth. If the status is not "sh_spd" at step M31, the flow follows a NO arrow to bypass steps M32 and M33.

At step M34 it is checked whether the status is "sh_dep" representing the depth of a scoop. If "sh_dep", the flow follows a YES arrow to advance to step M35 whereat the input value is set to the register "sh_dep". At step M36, a calculation is executed using both the scoop speed and depth.

If the status is not "sh-dep" at step M34, the flow follows a NO arrow to bypass steps M35 and M36.

At step M37 it is checked whether the status is "attack". If "attack", the flow follows a YES arrow to advance to step M38 whereat a value "tb1" [input value] obtained by processing the input value is set to the register "attack". At step M39, touch data is calculated.

If the status is not "attack" at step M37, steps M38 and M39 are bypassed. The process thereafter returns at step M40. Several types of input signals have been described above. The types of input signals may by increased or part of them may be omitted.

In the foregoing description, wind instruments are used by way of example wherein a plurality of parameters for a physical model tone signal synthesizer are controlled by input values designating musical tone characteristics. A physical model tone signal synthesizer is not limited only to a synthesizer for generating tones of wind instruments. For example, in the case of a physical model tone signal synthesizer for generating tones of stringed instruments, parameters such as bow speed, bow pressure, and the like can be controlled in a correlation manner by using musical tone characteristic parameters such as tone volume, tone color, and the like. The physical model tone signal synthesizer itself is not limited to only to that shown in FIG. 17.

Although the present invention has been described in connection with the preferred embodiments, the invention is not intended to be limited only to those embodiments. It is obvious that various modifications, improvements, combinations, and the like are apparent from those skilled in the art.

We claim:

1. A controller for a tone signal synthesizer for generating a tone signal in accordance with a plurality of parameters, comprising:

first and second manipulators responsive to a player performance which generate first and second manipulator signals, respectively, representing an amount of operation thereof;

first and second table means for receiving said first manipulator signal and outputting first and second table signals, respectively;

third and fourth table means for receiving said second manipulator signal and outputting third and fourth table signals, respectively;

first processor means for generating a time varying first parameter based on said first and third table signals;

second processor means for generating a time varying second parameter signal based on said second and fourth table signals; and tone signal controlling means for controlling and varying a tone signal depending on time, based on said first and second parameters.

2. A controller according to claim 1, wherein said tone signal synthesizer is a physical model tone signal synthesizer simulating a tone generating mechanism of a natural musical instrument.

3. A controller according to claim 1, wherein said first and second parameters include parameters representative of breath and embouchure.

4. A controller according to claim 1, wherein said first and second manipulators include a tone color manipulator for generating a tone color signal and a dynamics manipulator for generating a dynamics signal, wherein the amount of operation of the respective tone color and dynamics manipulators determines the values of the respective first and second manipulator signals.

5. A controller according to claim 4, wherein said first and second processor means includes means for generating first signals corresponding to breath and embouchure in accordance with said dynamics signal, and means for generating second signals corresponding to breath and embouchure in accordance with said tone color signal.

6. A controller according to claim 5, wherein said means for generating signals corresponding to breath and embouchure, includes a correlation table.

7. A controller according to claim 6, wherein said means for generating signals corresponding to breath and embouchure, includes means for changing said plurality of parameters with time.

8. A controller according to claim 1, wherein said parameter producing means includes correlation calculation means for generating a plurality of outputs for a single input.

9. A controller according to claim 8, wherein said parameter producing means further includes means for generating an envelope.

10. A controller according to claim 9, wherein said parameter producing means further includes means for adding fluctuation.

11. A controller according to claim 10, wherein said parameter producing means further includes means for providing modulation.

12. A controller according to claim 1 wherein said parameter producing means includes a correlation table storing correlation between parameters and manipulators.

13. A controller according to claim 5 wherein said first processor means comprises a signal generator for generating a breath signal based upon the first breath signal and the second breath signal.

14. A controller according to claim 5 wherein said second processor means comprises a signal generator for generating an embouchure signal based upon the first embouchure signal and the second embouchure signal.

15. A controller according to claim 1 further comprising a keyboard for generating a signal designating pitch.

16. A controller according to claim 1 further comprising a keyboard for generating a touch signal.

17. A method of generating a tone signal in accordance with a plurality of parameters comprising:

operating first and second manipulators;

generating first and second manipulator signals representing an amount of operation for each of the respective first and second manipulators; and providing first table means for receiving said first manipulator signal and outputting first and second table signals, respectively;

providing second table means for receiving said second manipulator signal and outputting third and fourth table signals, respectively;

generating a time varying first parameter based on said first and third table signals;

generating a time varying second parameter signal based on said second and fourth table signals; and controlling and varying a tone signal depending on time, based on said first and second parameters.

* * * * *